UNITED STATES PATENT OFFICE.

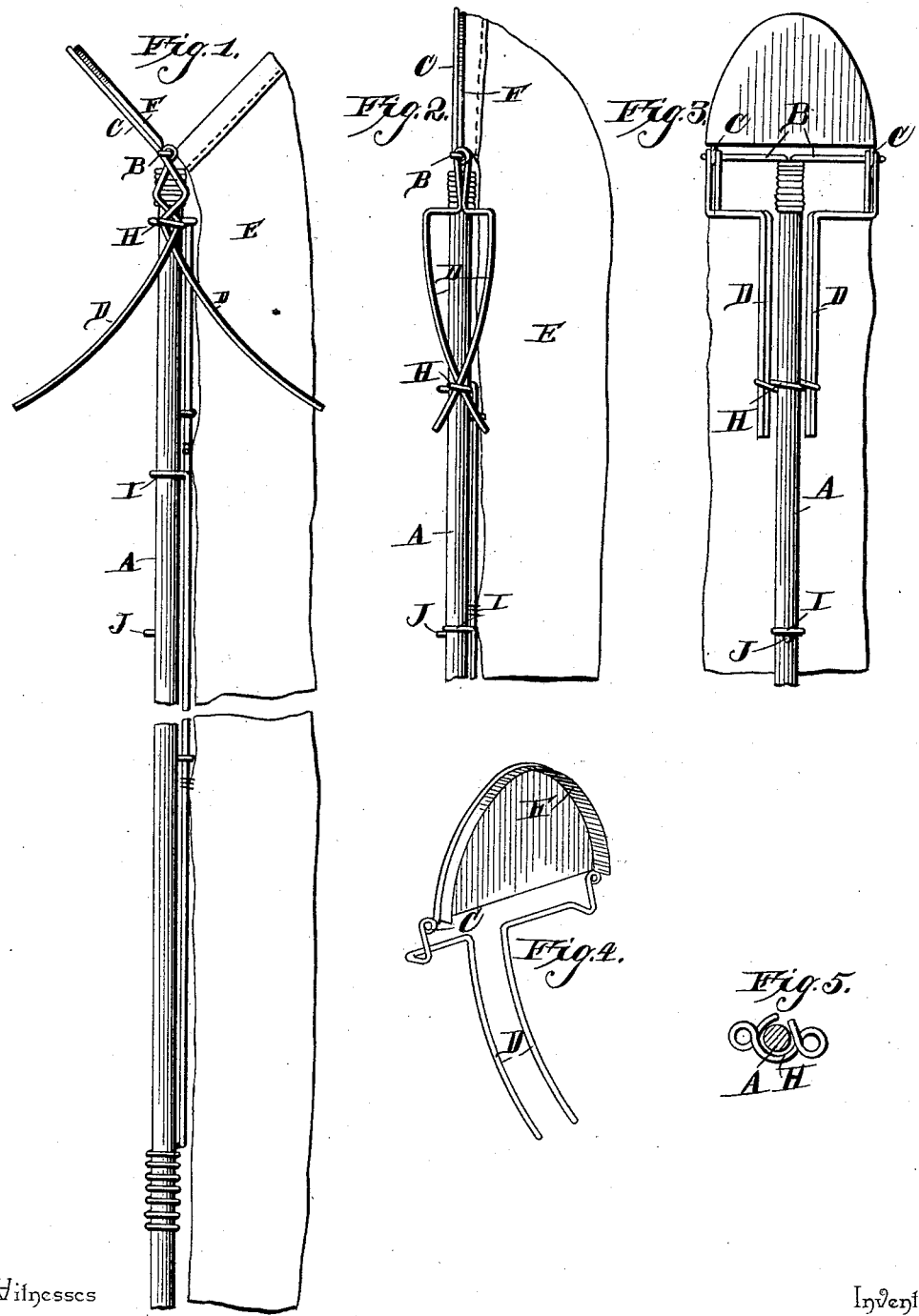

CHARLES J. BLOOM, OF ATCHISON, KANSAS.

FRUIT-GATHERER.

SPECIFICATION forming part of Letters Patent No. 411,007, dated September 17, 1889.

Application filed June 8, 1889. Serial No. 313,541. (No model.)

*To all whom it may concern:*

Be it known that I, CHARLES J. BLOOM, a citizen of the United States, residing at Atchison, in the county of Atchison and State of Kansas, have invented a new and useful Fruit-Gatherer, of which the following is a specification.

My invention relates to improvements in fruit-gatherers; and it consists in certain novel features hereinafter described and claimed.

In the accompanying drawings, Figure 1 is a side view showing the jaws separated to receive the fruit between them. Fig. 2 is a similar view showing the jaws brought together, and Fig. 3 is a front view. Fig. 4 is a detail view of one of the jaws. Fig. 5 is a horizontal section through the handle.

Referring to the drawings by letter, A designates the handle, to the upper end of which I secure the lateral arms B, upon which the jaws are fulcrumed. The jaws consist of wire frames C, which are fulcrumed on the arms B B, and are provided with the depending crossed spring-arms D, which lie alongside the handle. To the frame of one jaw I secure the tube or chute E, which extends to a point near the ground, and by which the fruit is conducted to any convenient receptacle. To the frame of the other jaw I secure a knife F, which is adapted to sever the stem of the fruit when the jaws are brought together in the operation of the device. The operating-rod is mounted on the handle, and is provided at its upper end with the rings or eyes H, through which the crossed spring-arms D pass. By this arrangement as the operating-rod is pushed upward the jaws will be separated, and as it is lowered the jaws will be brought together. The operating-rod is provided at an intermediate point of its length with the offset I, which is adapted to strike against a pin J, projecting from the handle, and thereby prevent the rod being drawn down too far, so as to bring the jaws completely together, and consequently injure the knife.

In practice, when it is desired to gather the fruit the jaws are separated and then made to pass on opposite sides of the fruit, after which the operating-rod is drawn downward, thereby bringing the jaws against the stem of the fruit, so as to sever the same and allow the fruit to fall through the gathering tube or chute.

It will be observed that my device is very light and is simple in its construction, so that it can be operated easily and rapidly, and the fruit gathered without injury.

Having thus described my invention, what I claim, and desire to secure by Letters Patent, is—

1. The combination of the handle, the jaws mounted thereon and having depending crossed arms, and the operating-rod mounted on the handle and provided with rings or eyes engaging the crossed arms of the jaws, as set forth.

2. The combination of the handle, the pin projecting therefrom, the jaws mounted on the handle and having depending crossed arms, and the operating-rod mounted on the handle and having rings or eyes engaging the crossed arms and provided with an offset adapted to impinge against the pin projecting from the handle, as set forth.

3. In a fruit-gatherer, the handle having the lateral arms B, the jaws mounted thereon and consisting of wire frames C, which are fulcrumed on the arms B, and are provided with the integral depending crossed spring-wire arms D, and the operating-rod provided with rings or eyes H, which slide on the crossed arms D, for the purpose set forth.

In testimony that I claim the foregoing as my own I have hereto affixed my signature in presence of two witnesses.

CHARLES J. BLOOM.

Witnesses:
B. F. TALBOTT,
B. L. ROBINSON.